(12) United States Patent
Coe et al.

(10) Patent No.: US 9,031,601 B2
(45) Date of Patent: May 12, 2015

(54) CONTROLLING RADIO TRANSMITTER POWER BASED ON SIGNAL PERFORMANCE

(75) Inventors: Peter Malcom Coe, Ottowa (CA); James Loo, Nepean (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 55 days.

(21) Appl. No.: 13/602,909

(22) Filed: Sep. 4, 2012

(65) Prior Publication Data
US 2013/0344830 A1    Dec. 26, 2013

Related U.S. Application Data

(60) Provisional application No. 61/663,943, filed on Jun. 25, 2012.

(51) Int. Cl.
| | | |
|---|---|---|
| H04B 7/00 | (2006.01) |
| H04W 52/36 | (2009.01) |
| H04W 52/14 | (2009.01) |
| H04W 52/34 | (2009.01) |

(52) U.S. Cl.
CPC .......... *H04W 52/367* (2013.01); *H04W 52/143* (2013.01); *H04W 52/343* (2013.01)

(58) Field of Classification Search
USPC ........ 455/522, 561, 126, 127.1, 127.2, 127.3, 455/127.5
See application file for complete search history.

(56) References Cited

U.S. PATENT DOCUMENTS

| | | | |
|---|---|---|---|
| 5,715,526 A | | 2/1998 | Weaver, Jr. et al. |
| 6,272,336 B1 * | | 8/2001 | Appel et al. ................. 455/423 |
| 6,760,598 B1 * | | 7/2004 | Kurjenniemi ................ 455/522 |
| 6,788,744 B1 * | | 9/2004 | Hirama .......................... 375/297 |
| 7,697,409 B2 * | | 4/2010 | Larsson ........................ 370/204 |
| 8,032,142 B2 * | | 10/2011 | Carter et al. ................... 455/444 |
| 2001/0006888 A1 * | | 7/2001 | Posti et al. ...................... 455/69 |
| 2001/0033558 A1 * | | 10/2001 | Matsuki ......................... 370/335 |
| 2004/0110475 A1 * | | 6/2004 | Korol ............................ 455/126 |
| 2006/0068727 A1 * | | 3/2006 | Salvi .......................... 455/127.2 |
| 2006/0264230 A1 * | | 11/2006 | Ozluturk ....................... 455/522 |
| 2007/0004351 A1 * | | 1/2007 | Dekker ...................... 455/127.1 |
| 2007/0232341 A1 | | 10/2007 | Sakata |
| 2008/0194281 A1 * | | 8/2008 | Sun et al. ...................... 455/522 |
| 2008/0287077 A1 * | | 11/2008 | Grundlingh et al. .......... 455/126 |
| 2009/0298448 A1 * | | 12/2009 | Mayer et al. ............... 455/127.2 |
| 2010/0002665 A1 | | 1/2010 | Oguchi |
| 2010/0265927 A1 * | | 10/2010 | Shearer et al. ................ 370/338 |

(Continued)

FOREIGN PATENT DOCUMENTS

EP    1830465 A2    9/2007

*Primary Examiner* — Nguyen Vo

(74) *Attorney, Agent, or Firm* — Coats & Bennett, PLLC

(57) ABSTRACT

Embodiments herein include a method of controlling the total power with which a radio transmitter of a radio access node transmits a signal. The method entails inputting an input signal into a power amplifier of the radio transmitter to produce, as a function of the input signal, an output signal to be transmitted by the radio transmitter. The method further entails generating a feedback signal from the output signal at the radio transmitter, and measuring that feedback signal to obtain one or more performance metrics that characterize performance of the output signal. The method finally includes comparing the one or more performance metrics to one or more performance metric thresholds, and controlling a maximum permissible level of the total power of the input signal, based on that comparison.

20 Claims, 13 Drawing Sheets

(56) References Cited

U.S. PATENT DOCUMENTS

| | | |
|---|---|---|
| 2011/0130105 A1 | 6/2011 | Chan et al. |
| 2011/0261713 A1 | 10/2011 | Kishiyama et al. |
| 2011/0300854 A1* | 12/2011 | Shan et al. ................. 455/422.1 |
| 2012/0071120 A1* | 3/2012 | Pinarello et al. ........... 455/127.5 |
| 2012/0075992 A1 | 3/2012 | Shahidi et al. |
| 2012/0157020 A1* | 6/2012 | Sasaki et al. ............... 455/127.1 |

* cited by examiner

CONTROLLING RADIO TRANSMITTER POWER BASED ON SIGNAL PERFORMANCE

RELATED APPLICATIONS

This application claims the benefit of U.S. Provisional Application No. 61/663,943, which was filed Jun. 25, 2012 and is incorporated by reference herein in its entirety.

TECHNICAL FIELD

The present invention generally relates to controlling the total power with which a radio transmitter transmits a signal and to controlling processing of such a signal, and particularly relates to performing such control based on measurement of a feedback signal that the transmitter generates from its output signal to characterize the output signal's performance.

BACKGROUND

Maximizing the total power with which a radio transmitter transmits a signal (not to be confused with the power levels with which the transmitter transmits individual channels carried by the signal) generally improves the transmitter's downlink capacity. Improved downlink capacity in this regard yields not only an increase in the number of users served by the radio transmitter, but also an increase in the throughput provided to each user.

Maximizing the transmitter's total transmit power must nonetheless be balanced against complying with various performance metric thresholds specified for the transmitted signal. For example, requirements that limit the signal's spectral emissions and targets that specify expectations for the signal's quality prove more difficult to comply with as the transmitter's total transmit power increases (with a corresponding increase in transmitter temperature). Radio transmitters must therefore be designed to control their maximum transmit power to balance downlink capacity improvement against signal performance.

Known radio transmitters are designed to control their maximum transmit power in this way by comparing the current transmitter temperature to temperature thresholds. For example, if the current transmitter temperature reaches or exceeds a first threshold, a transmitter backs off (i.e., derates) its maximum transmit power in order to remain in compliance with defined performance metric thresholds. And if the current transmitter temperature reaches or exceeds a second, higher threshold, the transmitter shuts down one or more of its components in order to protect transmitter hardware.

These temperature thresholds are established universally for an entire class of radio transmitters during the transmitter design phase. This design phase entails analyzing the signal performance of a few test transmitters under worst-case operating conditions and determining the temperature thresholds at which those test transmitters should adjust their maximum transmit power in order to comply with defined performance metric thresholds. This analysis is then extrapolated to all transmitters in the class by adding in margins to the determined thresholds, resulting in universal worst-case thresholds that will guarantee all transmitters in the class comply with the defined performance metric thresholds.

Sub-component device variations across the transmitters in the class, though, mean that the universal worst-case thresholds overly stifle the potential performance of at least some of the transmitters in the class. These stifled transmitters, for example, may actually be able to transmit at higher maximum power (or at the same maximum power for a longer amount of time) and still comply with the performance metric thresholds, but are artificially limited to transmitting at a lower maximum power (or at the same maximum power for a shorter amount of time) because of the universal and worst-case nature of the thresholds.

SUMMARY

One or more embodiments herein advantageously tailor control of an individual radio transmitter's maximum transmit power to the transmitter's actual ability to comply with defined performance metric thresholds. The transmitter evaluates its actual ability to comply with the performance metric thresholds by dynamically characterizing the performance of the transmitter's output signal, based on measurements of a feedback signal that the transmitter generates from that signal. With power control tailored in this way for a transmitter designed with a given cost, power dissipation, size, weight, and the like, the transmitter may transmit at a higher maximum power level under a wider range of operating conditions and thereby improve the transmitter's downlink capacity as compared to known approaches.

More particularly, embodiments herein include a radio transmitter of a radio access node. The radio transmitter includes a power amplifier configured to produce, as a function of an input signal into the power amplifier, an output signal to be transmitted by the radio transmitter. The radio transmitter also includes a feedback generation circuit configured to generate a feedback signal from the output signal. The radio transmitter further includes a power control circuit configured to measure this feedback signal to obtain one or more performance metrics that characterize performance of the output signal. The power control circuit is also configured to compare the one or more performance metrics to one or more performance metric thresholds, and to control a maximum permissible level of the total power of the input signal, based on that comparison.

In some embodiments, for example, the power control circuit includes an internal spectrum analyzer configured to measure the feedback signal to obtain at least one performance metric that characterizes performance of the output signal in terms of spectral emissions. In other embodiments, the power control circuit additionally or alternatively includes an internal signal quality monitor configured to measure the feedback signal to obtain at least one performance metric that characterizes performance of the output signal in terms of signal quality. Internal feedback-based characterization of the transmitter's spectral emissions and/or signal quality enables the transmitter to perform closer to specified emissions limits and/or signal quality targets.

Internal feedback-based characterization of the output signal's performance, in whatever terms, also enables faster control of the transmitter's maximum transmit power in response to changes in output signal performance, as compared to known approaches. In this regard, though, the power control circuit in some embodiments is configured to dynamically adapt the accuracy granularity or the periodicity of the feedback signal measurements based on at least one of (1) the total power with which the radio transmitter transmits the output signal; (2) a temperature measured by a temperature sensor included in the radio transmitter; and (3) one or more of the performance metrics.

In one embodiment, the power control circuit is configured to control the maximum permissible level of the total power of the input signal to maintain each performance metric in compliance with a corresponding performance metric threshold associated with a defined performance level of the output signal. In another embodiment, by contrast, the power control circuit is configured to control the maximum permissible level of the total power of the input signal to maintain at least one performance metric in long-term compliance with a corresponding threshold associated with a first defined performance level of the output signal (e.g., a moderate performance level), with tolerance for short-term non-compliance of that metric with the threshold.

Particularly with regard to the latter embodiment, the power control circuit in some cases monitors, based on the comparison, whether or not the at least one performance metric is in compliance with the corresponding performance metric threshold. Responsive to that monitoring indicating that the at least one performance metric is not in compliance, the power control circuit monitors a duration for which the at least one performance metric continues in non-compliance. Responsive to the duration reaching or exceeding a defined non-compliance duration threshold, the power control circuit decreases said maximum permissible level such that the at least one performance metric returns to being in compliance.

In some embodiments, the power control circuit is configured to tolerate such short-term non-compliance provided that a temperature measured by a temperature sensor included in the radio transmitter remains in compliance with a temperature threshold associated with a second defined performance level of the output signal. This second defined performance level reflects a lower performance level of the output signal than that reflected by the first defined performance level.

In at least one embodiment, the at least one performance metric for which short-term non-compliance is tolerated characterizes the performance of the output signal in terms of signal quality.

Regardless, the power control circuit is configured in some embodiments to control said maximum permissible level to also maintain at least one other of the one or more performance metrics in compliance with a corresponding performance metric threshold, without tolerance for short-term non-compliance with that threshold. For example, this at least one other performance metric may characterize the performance of the output signal in terms of spectral emissions.

In one or more embodiments, multiple different possible performance metric thresholds are defined for at least one performance metric, with different possible thresholds being associated with different possible performance levels of the output signal and different possible baseband processing parameter selections. In this case, the power control circuit is configured to select a performance metric threshold for the at least one performance metric from the different possible thresholds defined for that metric, based on a current baseband processing parameter selection. The power control circuit then compares the at least one performance metric to the threshold selected for that metric.

In at least one embodiment, the power control circuit is further configured to send feedback information to a baseband processing circuit of the radio access node directly or indirectly indicating the one or more performance metrics.

In this regard, embodiments herein also include a signal processing control circuit for controlling processing of a signal transmitted by a radio transmitter of a radio access node. The control circuit is configured to receive feedback information that directly or indirectly characterizes performance of an output signal of the radio transmitter based on measurement of a feedback signal generated by the radio transmitter from the output signal. The control circuit is also configured to adjust processing of an input signal to the radio transmitter based on the received feedback information.

In some embodiments, this adjustment entails adjusting baseband processing of the input signal to increase or decrease demands on the performance of the output signal. Such may involve adjusting at least one of: (1) one or more modulation and coding schemes applied to the input signal; (2) multi-antenna processing of the input signal; (3) impairment mitigation processing applied to the input signal; and (4) relative data power ratios associated with the input signal.

In other embodiment, the adjustment entails adjusting baseband or radio resource control processing of the input signal to assist the radio transmitter in meeting defined demands on the performance of the output signal. Such may involve adjusting at least one of bearer load-balancing and time-based scheduling of traffic to be transmitted over the input signal.

Embodiments herein also include corresponding methods performed respectively by the radio transmitter and the signal processing control circuit.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
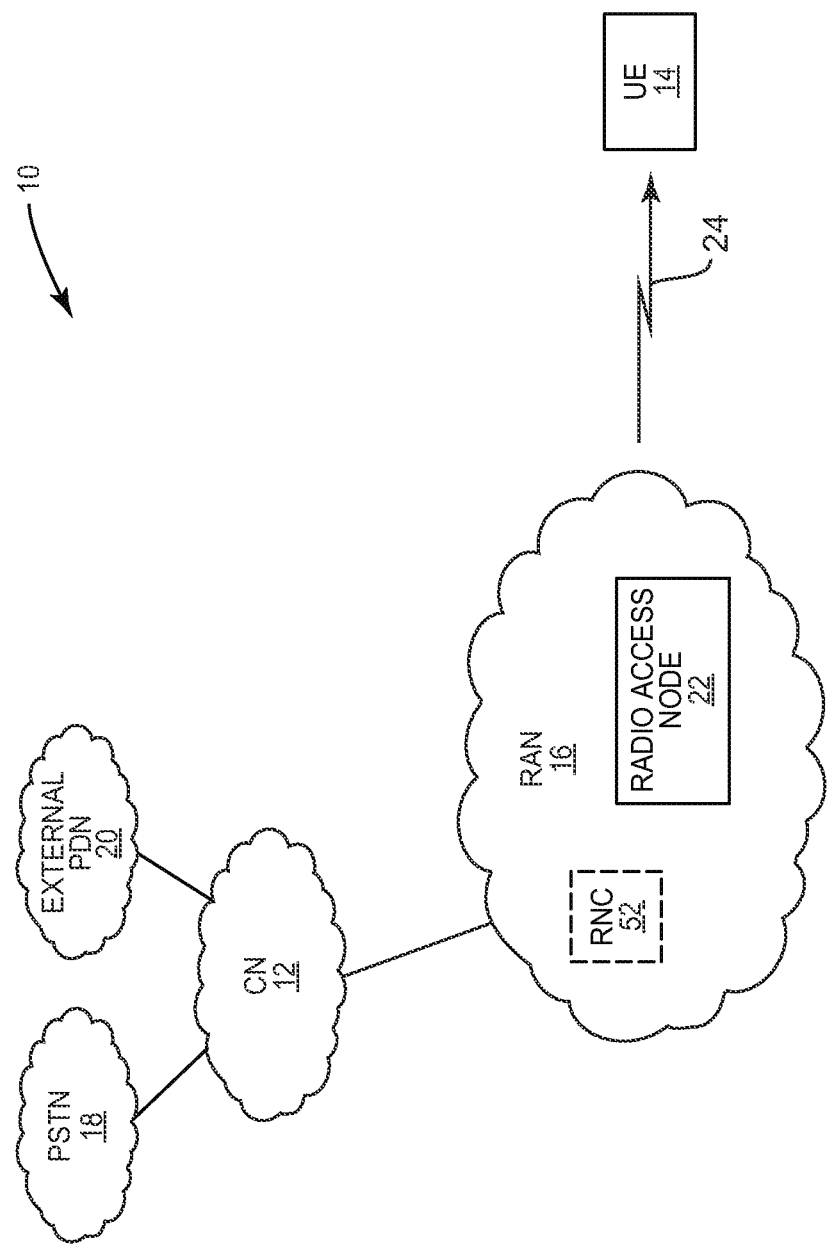
FIG. 1 is a block diagram of a wireless communication network comprising a radio transmitter and a signal processing control circuit configured according to one or more embodiments.

FIG. 1 depicts a wireless communication network 10. The network 10 comprises a core network (CN) 12 that connects user equipment (one of which is shown as UE 14) to one or more external networks via a radio access network (RAN) 16. The one or more external networks are shown in FIG. 1 as a public switched telephone network (PSTN) 18 and a packet data network (PDN) 20 such as the Internet.

The RAN 16 includes a plurality of radio access nodes, one of which is shown as radio access node 22. Radio access node 22 is configured to transmit a signal 24 to the UE 14 in order to convey information to the UE 14. In at least some embodiments, for example, this signal 24 carries one or more data channels for conveying user data, one or more control channels for conveying control information, and one or more common channels for conveying reference signals and/or synchronization signals to the UE 14. Moreover, in some embodiments, this signal 24 comprises a multi-carrier signal that conveys information to the UE 14 over multiple frequency carriers.

Figure 2:
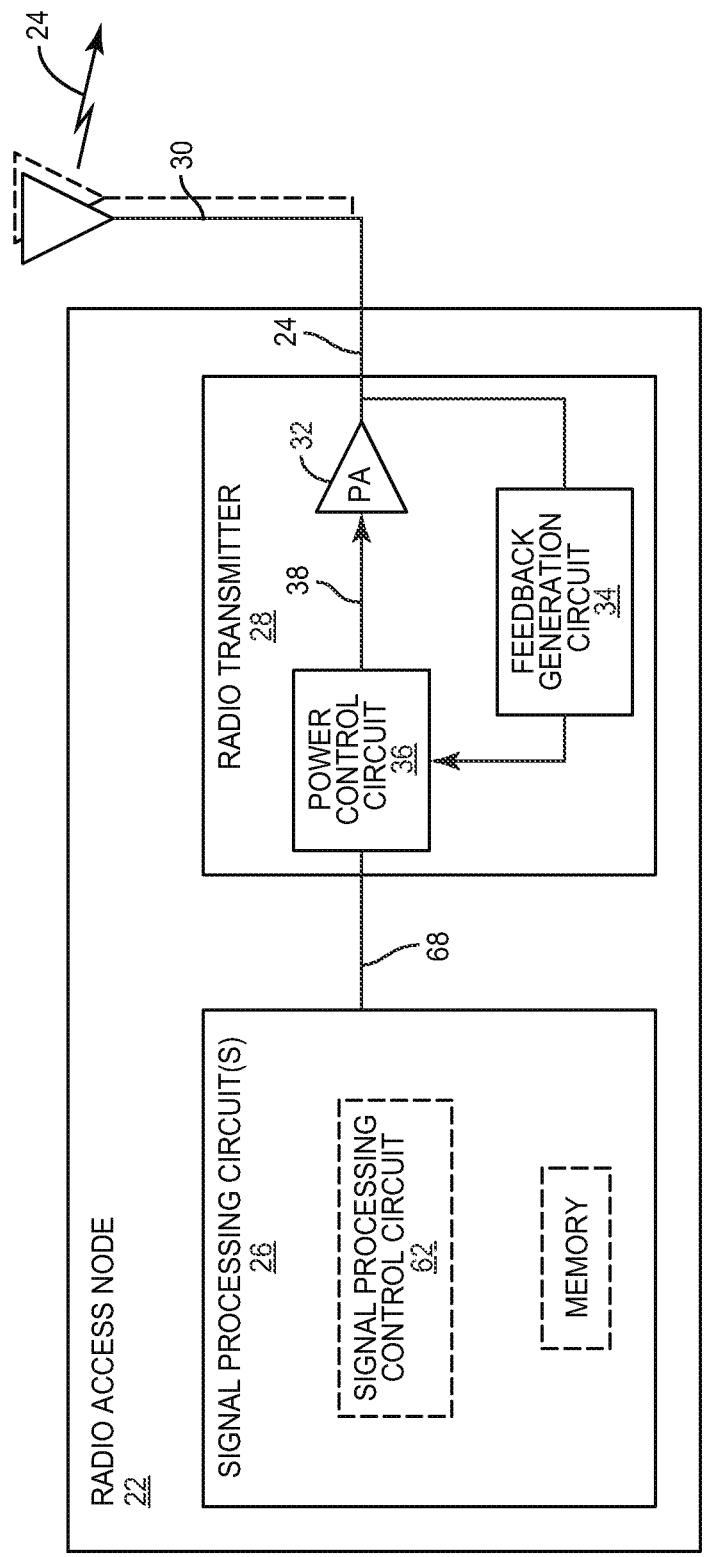
FIG. 2 is a block diagram of a radio access node that includes a radio transmitter and a signal processing control circuit configured according to one or more embodiments.

In more detail, the radio access node 22 is shown in FIG. 2 as comprising one or more processing circuits 26, a radio transmitter 28, and one or more antennas 30. The one or more processing circuits 26 are configured to generate information to be conveyed to the UE 14, and the radio transmitter 28 is configured to convey the generated information to the UE 14 by transmitting signal 24 to the UE 14 via the one or more antennas 30. In doing so, the transmitter 28 is configured to advantageously control the total power with which the signal 24 is transmitted.

The radio transmitter 28 is this regard specifically comprises a power amplifier 32, a feedback generation circuit 34, and a power control circuit 36. The power amplifier 32 is configured to produce, as a function of an input signal 38 into the power amplifier 32, the output signal 24 to be transmitted by the transmitter 28. The total power with which the output signal 24 is transmitted thus depends on the total power of the input signal 38, as amplified by the power amplifier 32.

The feedback generation circuit 34 is configured to generate a feedback signal 40 from the output signal 24. The power control circuit 36 advantageously measures this feedback signal 40 to obtain one or more performance metrics that characterize performance of the output signal 24. The power control circuit 36 compares these one or more performance metrics to one or more performance metric thresholds, and controls a maximum permissible level of the total power of the input signal 38 based on that comparison. By controlling the maximum permissible level of the total power of the input signal 38 in this way, the transmitter 38 advantageously tailors such control to the transmitter's actual ability to comply with the one or more performance metric thresholds.

In some embodiments, for example, the power control circuit 36 measures the feedback signal 40 to obtain at least one performance metric that characterizes performance of the output signal 24 in terms of spectral emissions. The power control circuit 36 in this case may comprise an internal spectrum analyzer configured to dynamically analyze the actual spectrum of the feedback signal 40 for emissions, as those emissions occur in the field. Additionally or alternatively, the internal spectrum analyzer may function as a peak-to-average power ratio (PAPR) monitor or a cubic metric (CM) monitor in order to indirectly analyze the output signal's spectral emissions by dynamically measuring and computing the PAPR or CM of the feedback signal 40.

Regardless of the particular implementation, this internal feedback-based characterization of the output signal's performance in terms of spectral emissions advantageously drives the transmitter 28 to perform closer to the limits imposed on those spectral emissions (e.g., by regulatory authorities). For example, rather than conservatively backing off maximum transmit power when the transmitter's temperature reaches a universal worst-case temperature threshold that has been generically established to guarantee an entire class of transmitters remains emissions compliant, the transmitter 28 herein may back off maximum transmit power only when internal feedback-based characterization of the transmitter's spectral emissions indicates emissions compliance is actually threatened. This means that, given a particular transmitter design, the transmitter 28 is able to transmit at a maximum transmit power that is higher (e.g., by 1.5 dB) than in known approaches.

Additionally or alternatively, the power control circuit 36 in other embodiments measures the feedback signal 40 to obtain at least one performance metric that characterizes performance of the output signal 24 in terms of signal quality. The power control circuit 36 in this case may comprise an internal signal quality monitor. This signal quality monitor may be configured to dynamically analyze the signal linearity of the feedback signal 40 (e.g., in terms of error vector magnitude (EVM)). Signal quality in this regard may also be measured in terms of block error rate (BLER), bit error rate (BER), or the like. Regardless, internal feedback-based characterization of the transmitter's signal quality likewise enables the transmitter 28 to perform closer to specified signal quality targets (as defined by corresponding signal quality thresholds).

Internal feedback-based characterization of the output signal's performance, in whatever terms, also enables faster control of the transmitter's maximum transmit power in response to changes in output signal performance, as compared to known approaches. Indeed, whereas transmitter temperature measurements reflect changes in output signal performance rather sluggishly due to the transmitter's thermal inertia, the feedback signal measurements herein reflect changes in output signal performance very quickly. In some embodiments, for example, measurement of the feedback signal 40 occurs with a periodicity on the order of many times per second.

That said, because such measurement consumes processing resources, one or more embodiments herein dynamically adapt this measurement periodicity in order to balance fast power control against processing resource conservation. Fast power control may be prioritized, for example, when performance compliance is threatened or otherwise stressed. For example, measurement periodicity in some embodiments is dynamically adapted based on the total power with which the transmitter 28 transmits the output signal 24 (the higher the power, the smaller the measurement periodicity and thus the more often the measurements are performed). Additionally or alternatively, measurement periodicity in other embodiments is dynamically adapted based on a temperature measured by a temperature sensor included in the transmitter 28, or based on one or more of the performance metrics (e.g., in relation to the one or more corresponding performance metric thresholds). Similarly, the accuracy granularity of the feedback signal measurements may be dynamically adapted in much the same way.

Regardless, the one or more performance metric thresholds in at least some embodiments are associated with a defined performance level of the output signal 24. This defined performance level may be one of multiple different performance levels effectively defined for the output signal 24. For example, the power control circuit 36 may define a moderate performance level for the output signal 24 as well as a minimum performance level for the output signal 24. In this case, the one or more performance metric thresholds may be associated with either the moderate performance level or the minimum performance level. Regardless, by tailoring power control to the transmitter's ability to comply with the one or more thresholds, the transmitter 38 in these embodiments effectively tailors power control to the transmitter's ability to provide the output signal 24 with the defined performance level.

Tailoring power control in this way may entail ensuring that the transmitter 28 maintains the output signal 24 with at least the defined performance level. In one embodiment, for example, the power control circuit 36 is configured to control the maximum permissible level of the total power of the input signal 38 to maintain each performance metric in compliance with a corresponding performance metric threshold associated with the defined performance level of the output signal 24 (e.g., a moderate performance level or a minimum performance level).

Figure 3:
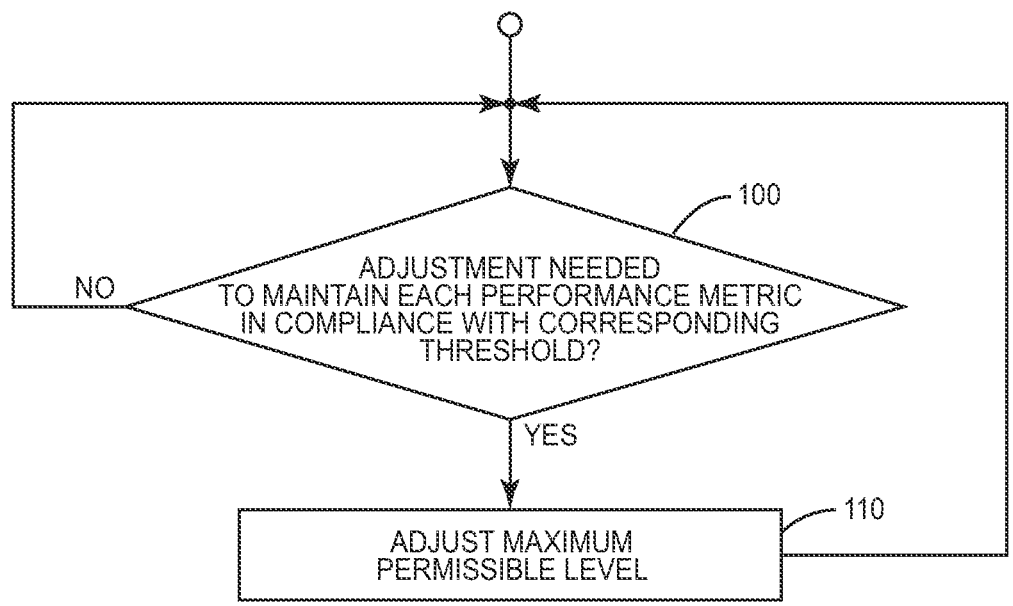
FIG. 3 is a logic flow diagram of processing performed by a power control circuit of a radio transmitter according to one or more embodiments.

FIG. 3 illustrates exemplary processing performed by the power control circuit 36 in this case. As shown, the power control circuit 36 recursively determines (i.e., monitors) whether or not an adjustment to the maximum permissible level of the total power of the input signal 38 is needed in order to maintain each performance metric in compliance with the corresponding threshold (Block 100). If such an adjustment is needed (YES at Block 100), then the power control circuit 36 performs that adjustment (Block 110) and continues to monitor whether additional adjustments are needed.

For example, the defined performance level of the output signal 24 may be associated with (1) a performance metric threshold defining a minimum signal quality that must be maintained in order to provide the signal 24 with the defined performance level; and (2) a different performance metric threshold defining a maximum level of spectral emissions that must not be exceeded in order to provide the signal 24 with the defined performance level. As transmitter operating conditions vary (e.g., in terms of the transmitter's temperature, input DC voltage, carrier assignment within the system bandwidth, maximum carrier separation, etc.), the power control circuit 36 dynamically measures the feedback signal 40 in order to characterize the signal quality and spectral emissions of the output signal 24. Based on comparing the measured signal quality and spectral emissions to corresponding thresholds defining the minimum signal quality level and maximum spectral emission level, the power control circuit 36 adjusts the maximum permissible level of the total power of the input signal 38, as needed, in order to maintain measured signal quality at or above the defined minimum level and to maintain measured spectral emissions below the defined maximum level.

Figure 4:
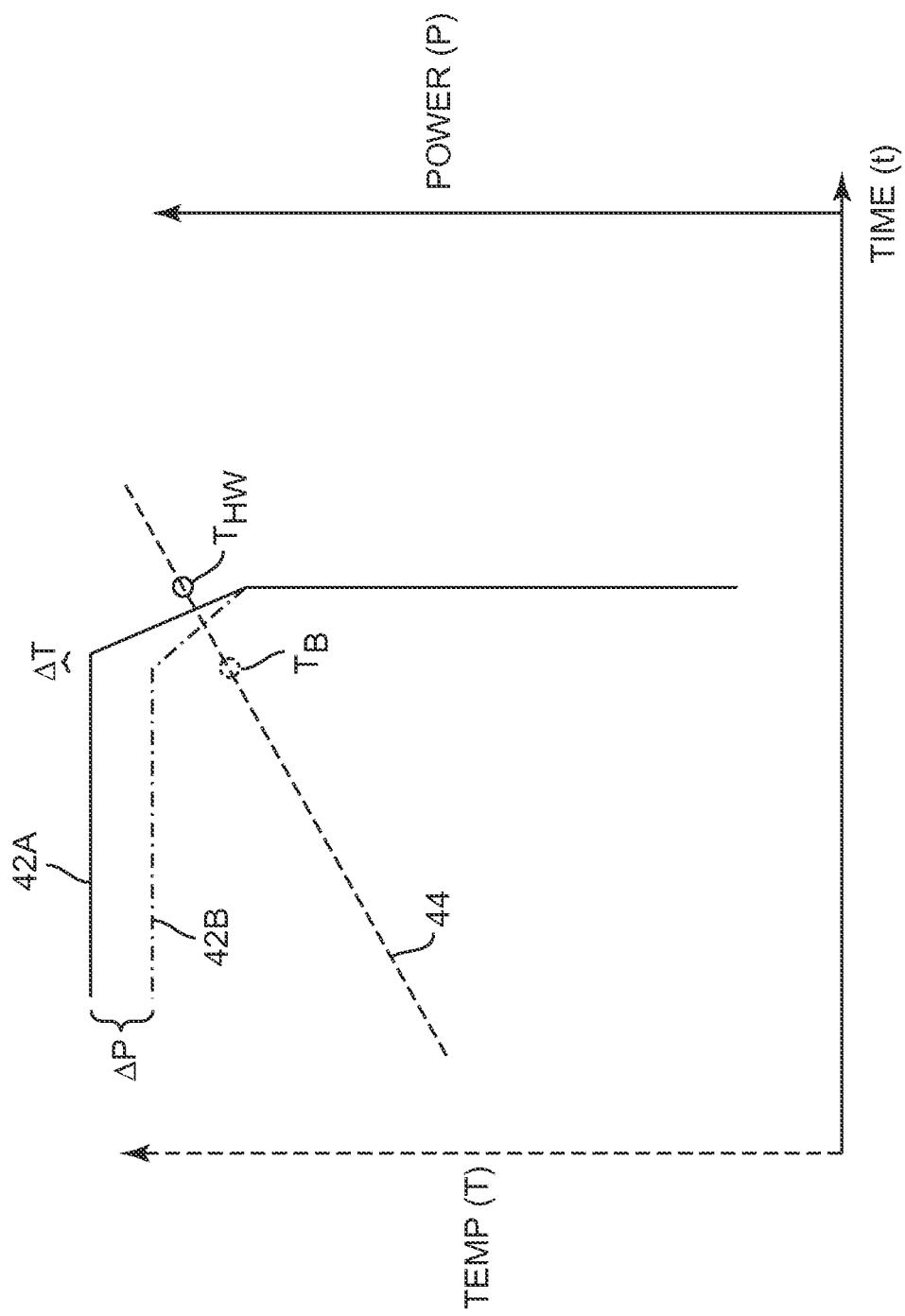
FIG. 4 is a graph illustrating embodiments where each performance metric is maintained in compliance with a corresponding performance metric threshold associated with a defined performance level of the output signal.

Because the transmitter 28 tailors power control based on the measured extent to which it actually provides an output signal 24 with a defined performance level, the transmitter 28 transmits the signal 24 at a maximum power level that is higher than if it were to perform power control according to known approaches. FIG. 4 shows, for example, that the transmitter 28 (on average) transmits the signal 24 at a maximum power level 42A that is ΔP higher than the maximum power level 42B at which it would have otherwise transmitted the signal 24 had it performed power control according to known approaches. Indeed, whereas known approaches would have artificially limited the transmitter 28 to transmitting with a lower maximum power level 42B in order to guarantee the defined performance level, the transmitter 28 herein intelligently transmits with a higher maximum power level 42A based on measured knowledge that the defined performance level is actually being provided.

The transmitter 28 tailors power control in this way even as the transmitter's temperature 44 increases (e.g., in association with the power amplifier 32 nearing its non-linear region). In particular, the transmitter 28 in at least some embodiments does not initiate back off of its maximum power level 42A until after the transmitter's temperature 44 has exceeded the universal worst-case temperature threshold $T_B$ (e.g., by $\Delta T$) that would have otherwise triggered backoff according to known approaches. This is because, rather than conversatively triggering backoff upon determining that the transmitter's temperature 44 has reached such a universal temperature threshold $T_B$, the power control circuit 36 intelligently triggers backoff when measurement of the feedback signal 40 indicates backoff is needed for maintaining the defined performance level of the output signal 24. With backoff triggering tailored to the specific transmitter 28 in this way, the transmitter 28 triggers backoff at a different point than other transmitters in a class of transmitters to which it belongs.

Of course, although the power control circuit 36 does not trigger backoff based on a universal worst-case temperature threshold $T_B$, the circuit 36 in at least some embodiments still shuts down one or more transmitter components responsive to the transmitter's temperature 44 reaching or exceeding a universal worst-case temperature threshold $T_{HW}$. Such prioritizes protecting the transmitter's hardware from damage over the additional improvements to the transmitter's downlink capacity that might otherwise be realized were hardware protection to instead be based on feedback signal measurements.

In contrast to embodiments described above with respect to FIGS. 3 and 4, which proactively control maximum transmit power to maintain each performance metric in compliance with a corresponding threshold, other embodiments herein tolerate short-term non-compliance of at least one performance metric with its corresponding threshold. More particularly, the power control circuit 36 in some embodiments herein is configured to control the maximum permissible level of the total power of the input signal 38 to maintain at least one performance metric in long-term compliance with a corresponding threshold associated with a first defined performance level of the output signal 24 (e.g., a moderate performance level), with tolerance for short-term non-compliance of that metric with the threshold. While tolerating this short-term non-compliance, the transmitter 28 may transmit at a higher maximum power level as needed to service short-term peaks in the demand for downlink capacity. The transmitter 28 may also better exploit the statistical nature of multi-carrier transmissions during short-term non-compliance, by for instance configuring four 20 W GSM carriers for transmission even though the transmitter 28 may only be rated for 60 W maximum output power (because statistically the probability of having all four carriers simultaneously at maximum output is low).

Figure 5:
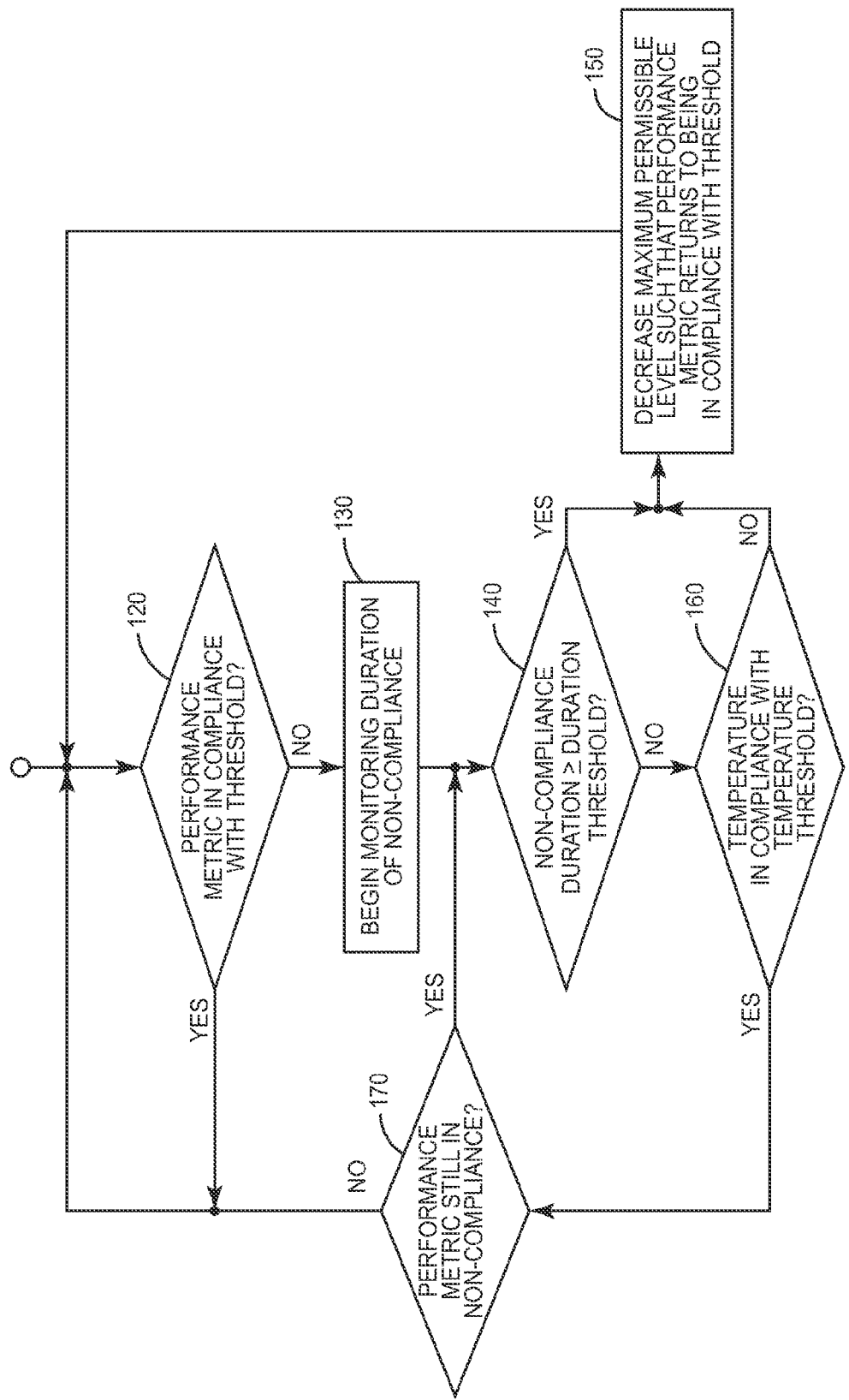
FIG. 5 is a logic flow diagram of processing performed by a power control circuit of a radio transmitter according to one or more other embodiments.

Moreover, the extent and/or duration of the non-compliance advantageously permits the transmitter 28 in some embodiments to transmit at this higher maximum power level with minimal degradation to the performance of the output signal 24. In at least one embodiment, for example, the power control circuit 36 tolerates short-term non-compliance of a performance metric that characterizes the performance of the output signal 24 in terms of signal quality. This tolerance for short-term degradation to the output signal's quality allows the power control circuit 36 to increase the maximum permissible level of the total power of the input signal 38 as needed to service short-term peaks in downlink capacity demand. The extent and/or duration of the signal quality degradations that are permitted may be intelligently limited by the power control circuit 36 based on knowledge of the end-to-end implications of those degradations, e.g., based on how the signal quality degradations affect user perceived quality. For instance, the power control circuit 36 in some embodiments intelligently limits the extent and/or duration of EVM non-compliance with a corresponding EVM threshold in order to cause only a slightly elevated BLER at UE 14 that does not meaningfully affect user perceived quality. FIG. 5 illustrates additional details with regard to limiting the extent and/or duration of at least one performance metric's non-compliance, according to one or more embodiments.

As shown in FIG. 5, processing at the power control circuit 36 in these embodiments entails monitoring whether or not the at least one performance metric is in compliance with the corresponding threshold associated with the first defined performance level (Block 120). If the metric is not in compliance (NO at Block 120), processing includes beginning to monitor the duration for which the metric continues in non-compliance (Block 130) and comparing this duration to a defined non-compliance duration threshold (Block 140). Responsive to the duration reaching or exceeding this threshold (YES at Block 140), processing entails decreasing (i.e., backing off) the maximum permissible level of the total power of the input signal 38 such that the performance metric returns to being in compliance (Block 150).

Figure 6:
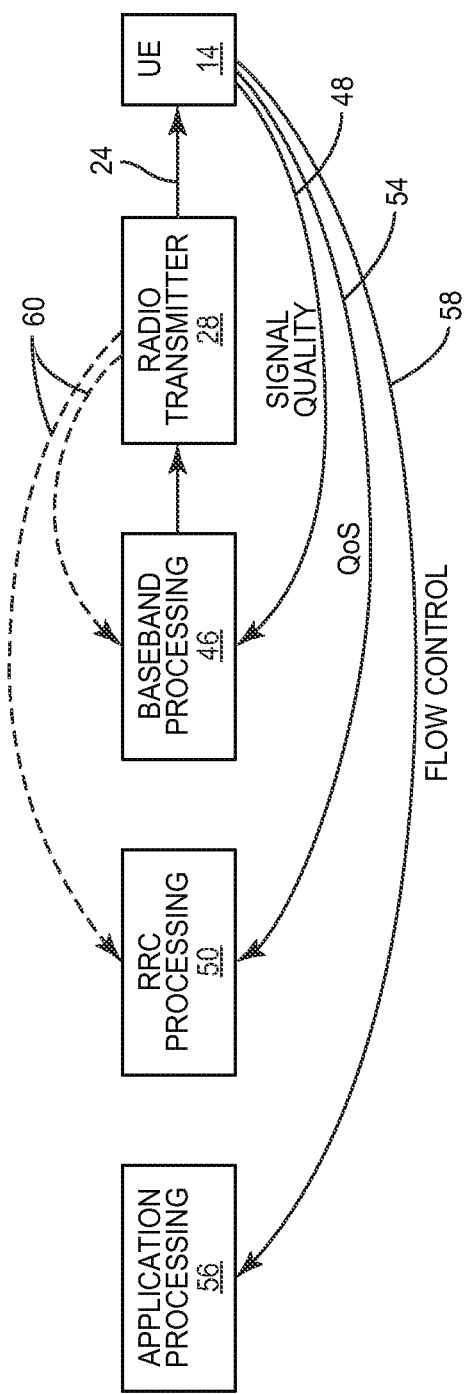
FIG. 6 is a block diagram of processing in the wireless communication network and various feedback provided to such processing according to one or more embodiments.

In at least some embodiments, the non-compliance duration threshold is intelligently defined based on knowledge of the end-to-end implications of the metric's non-compliance. The threshold may be defined, for instance, based on knowledge that mechanisms in the network 10 will adapt to the metric's non-compliance and mitigate the non-compliance's degradation to user perceived quality. Depending on the location of these mechanisms in the network 10, the mechanisms may detect such non-compliance based on feedback from the radio transmitter 28 itself (as explained in more detail below) or may detect non-compliance via feedback from the UE 14 regarding signal quality, quality of service (QoS), or flow control. FIG. 6 illustrates these mechanisms in additional detail, according to one or more embodiments.

As shown in FIG. 6, baseband processing 46 at the radio access node 22 (e.g., as performed by signal processing circuit(s) 26 in FIG. 1) may detect short-term signal quality degradations via signal quality feedback 48 from the UE 14 and adapt accordingly in order to mitigate degradation to user perceived quality. Such adaptation may entail, for example, adapting impairment mitigation processing (e.g., hybrid automatic repeat request (HARQ)), the modulation and coding scheme (MCS), and/or the multi-antenna processing applied to the signal 24 to be more robust. As yet other examples, this adaptation may include adapting the relative power ratios associated with different channels/signals of the output signal 24 and/or adapting time-based scheduling of traffic to be transmitted over the signal 24.

FIG. 6 also shows that radio resource control (RRC) processing 50 (either embodied in the radio access node 22 itself or in a separate radio network controller (RNC) 52) may detect short-term degradations via QoS feedback 54 from the UE 14 and adapt accordingly in order to mitigate degradation to user perceived quality. Adaptation in this regard may include performing bearer load-balancing in order to efficiently assign UE bearer traffic to a different RAN 16 or other access mechanism supported by the UE 14.

Finally, FIG. 6 illustrates that application-level processing 56 may detect short-term degradations via flow control feedback 58 (e.g., ACKs and NACKs) from the UE 14 and adapt accordingly in order to mitigate degradation to user perceived quality. Adaptation in this regard may include automatically throttling the data rate to reduce the load on the radio transmitter 28.

With this understanding of the various upstream mechanisms available to adapt to the metric's short-term non-compliance, the non-compliance duration threshold may be defined based on the assumption that one or more of these mechanisms will mitigate the non-compliance's degradation to user perceived quality. The threshold in some embodiments may, for instance, be defined to be a few 100 milliseconds, a few seconds, or even a few tens of seconds). Regardless, counting on upstream processing in this way, the transmitter 28 is able to service short-term downlink capacity demand increases by increasing its maximum transmit power. Of course, as noted above, if the demand increases persist for more than the duration threshold (meaning that the resulting output signal degradations would be sustained for more than the duration threshold), the transmitter 28 decreases its maximum transmit power such that the performance metric returns to being in compliance (Block 150 in FIG. 5).

In addition to limiting the duration of a performance metric's non-compliance, other embodiments herein also limit the extent of a performance metric's non-compliance. In one embodiment, for example, the power control circuit 36 maintains the performance metric in long-term compliance with a corresponding first threshold associated with a first defined performance level of the output signal 24 (e.g., a moderate performance level). In doing so, the power control circuit 36 tolerates short-term non-compliance of the performance metric with that first threshold, provided that the performance metric remains in short-term compliance with a corresponding second threshold associated with a second defined performance level of the output signal 24 (e.g., a minimum performance level). This second defined performance level reflects a lower performance level of the output signal 24 than that reflected by the first defined performance level. Where the performance metric characterizes the EVM of the output signal 24, for example, the power control circuit 36 may tolerate short-term non-compliance of the EVM with a moderate performance EVM threshold, provided that the EVM remains in short-term compliance with a minimum performance EVM threshold.

Instead of using a second performance metric threshold to limit the extent of short-term non-compliance, other embodiments herein use a universal temperature threshold associated with the second defined performance level to limit that extent. Specifically, the power control circuit 36 in these embodiments tolerates a performance metric's short-term non-compliance provided that a temperature measured by a temperature sensor included in the transmitter 28 remains in compliance with a temperature threshold associated with the second defined performance level. FIG. 5 illustrates additional details in this regard.

As shown in FIG. 5, even if the duration of the performance metric's non-compliance is within the duration threshold (NO at Block 140), the power control circuit 36 nonetheless determines whether the transmitter's temperature is in compliance with the temperature threshold (Block 160). If not (NO at Block 160), then the power control circuit 36 still decreases the maximum permissible level of the total power of the input signal 38 such that the performance metric returns to being in compliance (Block 150). This process of checking whether the performance metric's non-compliance duration is within the defined threshold and whether the extent of the non-compliance has degraded performance to a second defined performance level repeats (e.g., via Block 170) until the performance metric returns to compliance.

Figure 7:
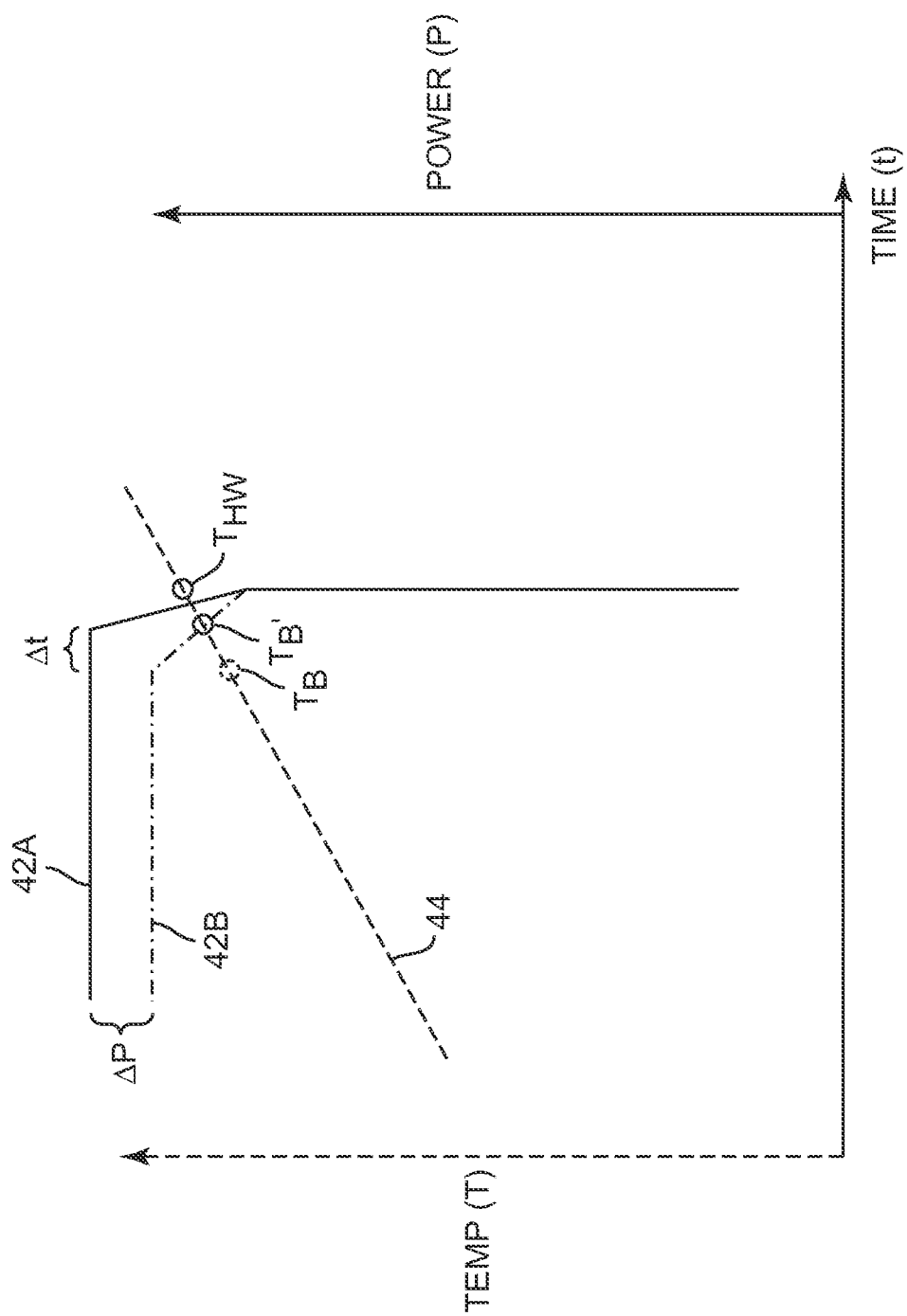
FIGS. 7 and 8A-8C are graphs illustrating embodiments that tolerate short-term non-compliance of a performance metric.
Figure 8A:
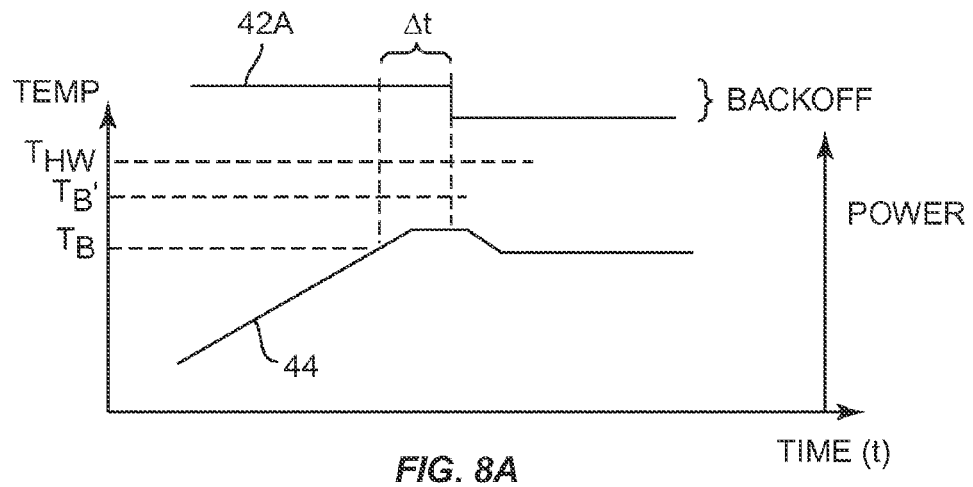
Figure 8B:
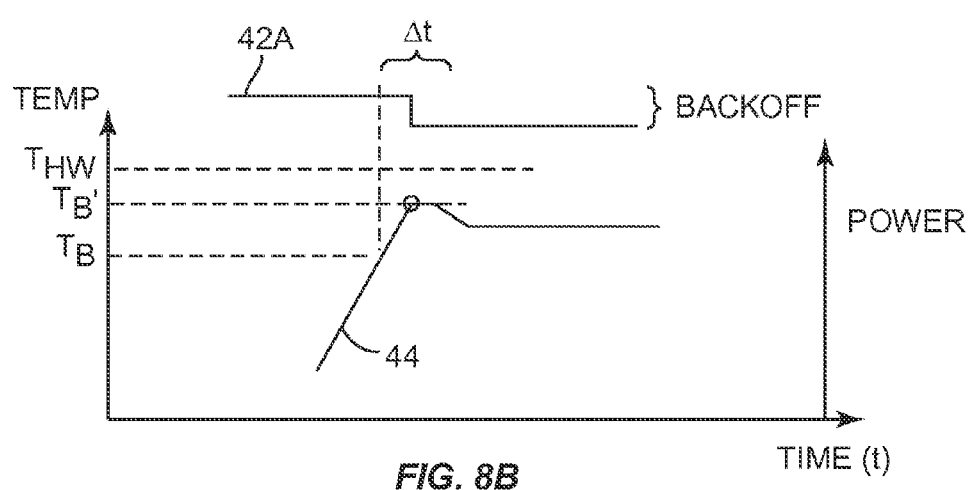
Figure 8C:
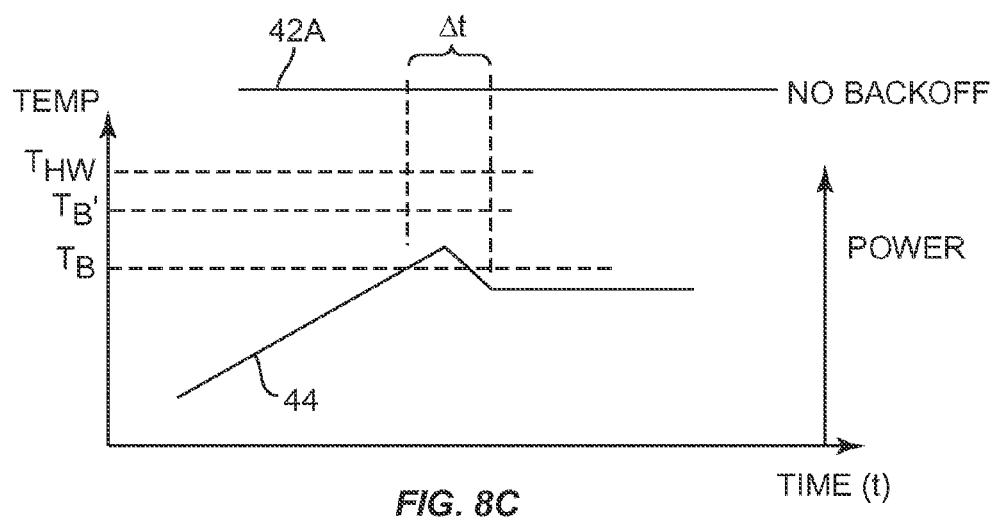

FIGS. 7 and 8A-8C depict these embodiments in contrast to embodiments described with reference to FIG. 4 that do not tolerate short-term non-compliance. As shown in FIG. 7, the transmitter 38 transmits the signal 24 at a maximum power level 42A. When the transmitter's temperature 44 reaches a certain temperature (assumed purely for convenience to be the universal worst-case temperature threshold $T_B$ that would have triggered backoff in known approaches), the transmitter 28 determines based on measurement of the feedback signal 40 that a performance metric (e.g., reflecting signal quality) becomes non-compliant with a corresponding threshold associated with a first defined performance level (e.g., a moderate performance level). Responsive to such non-compliance, the transmitter 28 continues to transmit the signal 24 at maximum power level 42A, but begins to monitor the duration and extent of the non-compliance. If the non-compliance's duration reaches Δt, then the transmitter 28 triggers backoff and decreases the maximum power level 42A to restore the metric to compliance. Alternatively, if the non-compliance's extent degrades performance to a second defined performance level (e.g., a minimum performance level), as detected by the transmitter's temperature 44 reaching or exceeding a universal worst-case temperature threshold $T'_B$, where $T'_B > T_B$, then the transmitter 28 triggers backoff and decreases the maximum power level 42A to restore the metric to compliance. FIG. 7 shows that the transmitter's temperature 44 reaches this threshold $T'_B$ just as the non-compliance's duration reaches Δt, but that of course need not be the case for the transmitter 28 to trigger backoff. FIGS. 8A-8C, for example, depict other cases.

As shown in FIG. 8A, the transmitter 28 initiates backoff, even though the transmitter's temperature 44 does not reach the threshold $T'_B$, because the non-compliance's duration reaches Δt. FIG. 8B, by contrast, shows that the transmitter 28 initiates backoff, even before the non-compliance's duration reaches Δt, because the transmitter's temperature 44 reaches the threshold $T'_B$. Finally, FIG. 8C illustrates an example where the transmitter 28 never initiates backoff despite non-compliance, because the non-compliance's duration never reaches Δt and the transmitter's temperature 44 never reaches the threshold $T'_B$.

Figure 9:
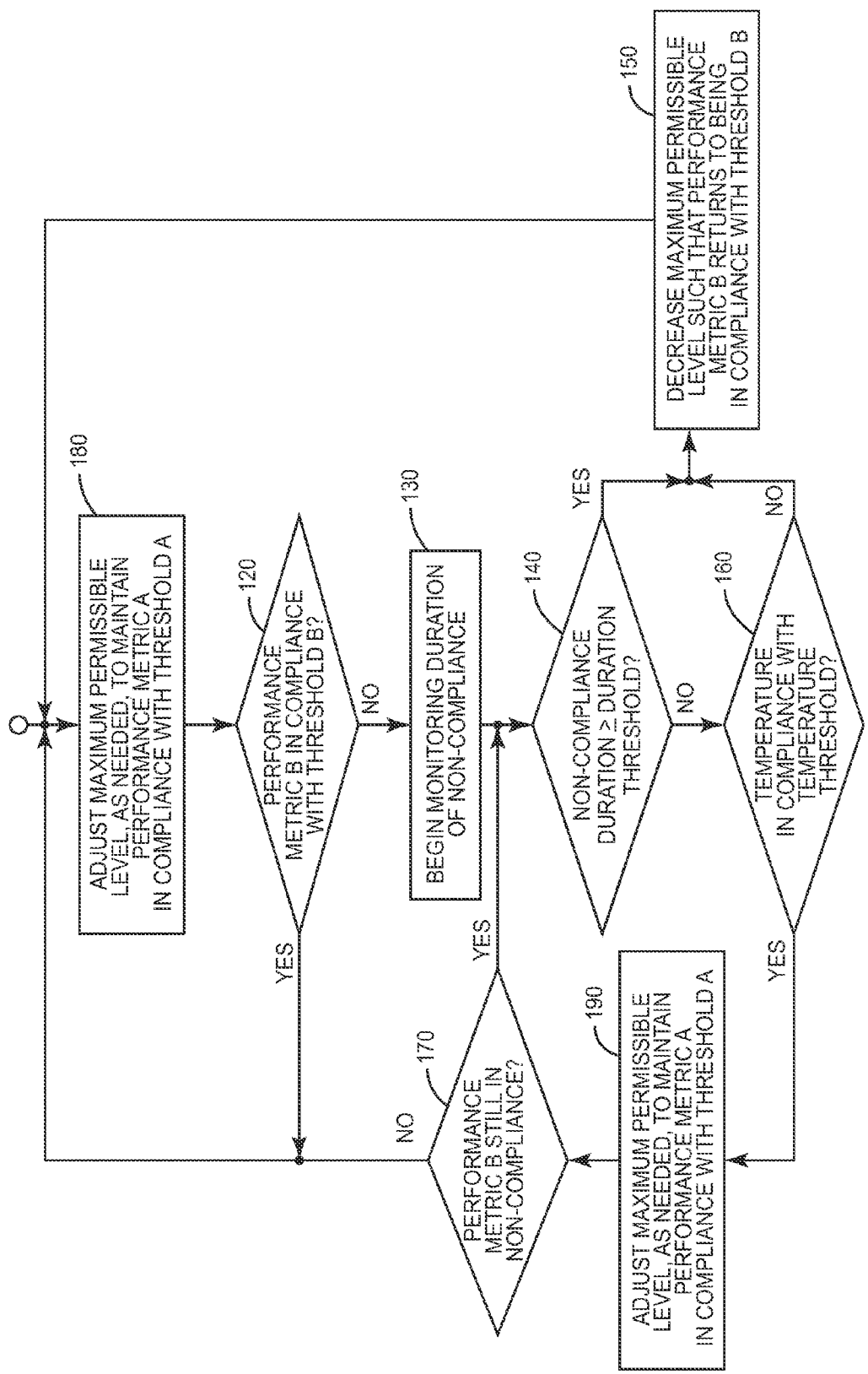
FIG. 9 is a logic flow diagram of processing performed by a power control circuit of a radio transmitter according to yet one or more other embodiments.

Note that in at least some embodiments, the transmitter 28 intelligently exploits the availability of the feedback signal 40 to prioritize one or more performance metrics over one or more other performance metrics. The transmitter 28 in this case may be intolerant to short-term non-compliance of these prioritized performance metrics, while remaining tolerant to short-term non-compliance of the other, non-prioritized metrics. Thus, the power control circuit 36 controls the maximum permissible level of the total power of the input signal 38 to also maintain one or more non-prioritized performance metrics in compliance with a corresponding performance metric threshold, without tolerance for short-term non-compliance with that threshold. FIG. 9 illustrates additional details of such an embodiment.

As shown in FIG. 9, the power control circuit 36 adjusts the maximum permissible level of the total power of the input signal 38, as needed, to maintain a prioritized performance metric (e.g., metric A) in compliance with a corresponding threshold (threshold A) (Blocks 180 and 190). Other processing performed by the power control circuit 36 (Blocks 120-170) remains the same as described in FIG. 5 for tolerating a certain duration and extent of short-term non-compliance of a non-prioritized performance metric (e.g., metric B) with a corresponding threshold (threshold B).

In one embodiment, the power control circuit 36 prioritizes a performance metric that characterizes output signal performance in terms of spectral emissions, over a performance metric that characterizes output signal performance in terms of signal quality. The power control circuit 36 tolerates short-term non-compliance of signal quality, but not spectral emissions. Where the first and second performance levels described above are moderate and minimum performance levels, for example, short-term maximum power levels may be allowed to adjust provided that spectral emissions remain compliant with defined emissions requirements, output signal performance in terms of signal quality remains at or above a minimum performance level, and hardware protection temperature thresholds are not exceeded. Limitations on the extent and duration of these short-term adjustments ensure that long-term output signal performance in terms of signal quality remains at or above a moderate performance level.

In at least some embodiments, the particular one or more performance metric thresholds that are associated with a given performance level vary depending on the baseband processing parameters applied by the radio access node 22 to the signal 24. In this case, multiple different possible performance metric thresholds are defined for at least one performance metric. Different ones of these possible thresholds are associated with different possible performance levels of the output signal 24 and different possible baseband processing parameter selections. The power control circuit 36 is thus configured to select a performance metric threshold for the at least one performance metric from the different possible thresholds defined for that metric, based on a current baseband processing parameter selection (e.g., as fed forward from the signal processing circuit(s) 26. The power control circuit 36 is then configured to compare the at least one performance metric to the threshold selected for that metric.

For example, in some embodiments multiple different possible thresholds are defined for a performance metric that characterizes output signal performance in terms of signal quality. Different signal quality thresholds are associated with different performance levels of the output signal 24 and different MCS selections, since different MCS selections tolerate different signal qualities). The power control circuit 36 receives the current MCS selection fed forward from the signal processing circuit(s) 26 and then selects the signal quality threshold corresponding to the current MCS selection, for comparison to the measured signal quality of the output signal 24.

Alternatively or additionally to the power control circuit 36 receiving such information fed forward from the signal processing circuit(s) 26, the power control circuit 36 in at least some embodiments feeds other information 60 (shown in FIG. 6) back to the signal processing circuit(s) 26 (and/or to the RNC 52 in applicable embodiments) to directly or indirectly indicate the one or more performance metrics. In one embodiment, for example, the power control circuit 36 sends feedback information 60 that comprises the actual one or more performance metrics obtained based on measurement of the feedback signal 40. In another embodiment, the power control circuit 36 sends feedback information 60 that describes the comparison of the one or more performance metrics to the one or more performance metric thresholds, and/or that describes how the maximum permissible level of the total power of the input signal 38 is controlled based on such comparison.

Regardless, a signal processing control circuit herein is configured to receive the feedback information 60 and to adjust processing of an input signal to the radio transmitter 28 based on that feedback information 60. FIG. 2 depicts such a circuit as being included in the radio access node's signal processing circuit(s) 26, as signal processing control circuit

Figure 10:
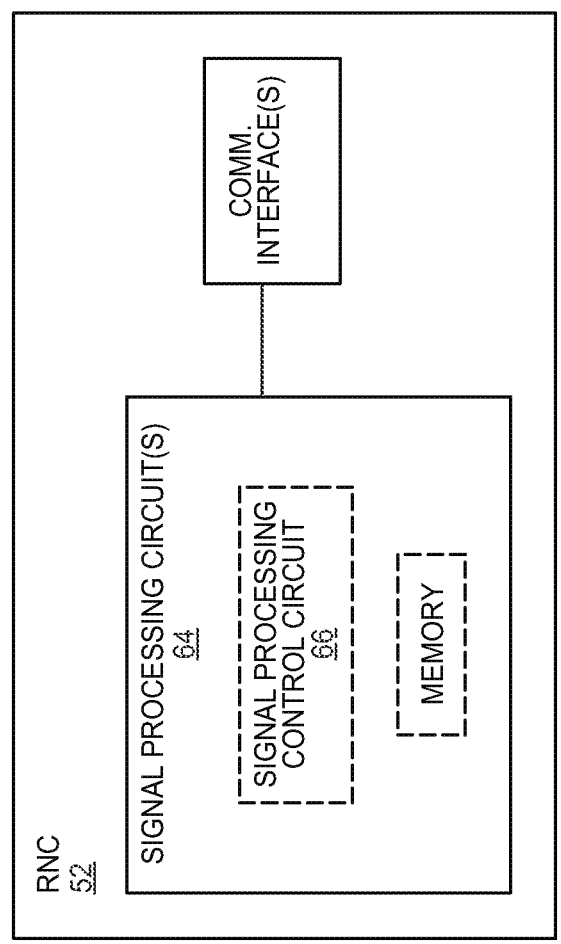
FIG. 10 is a block diagram of a radio network controller that includes a signal processing control circuit according to one or more embodiments.

62. FIG. 10 by contrast depicts such a circuit as additionally or alternatively being included in the RNC's signal processing circuit(s) 64, as signal processing control circuit 66.

Consider embodiments involving signal processing control circuit 62 in FIG. 2. In some of these embodiments, the control circuit 62 is configured to adjust baseband processing of input signal 68 to the radio transmitter 28 based on feedback information 60. In one such embodiment, the control circuit 62 adjusts baseband processing of the input signal 68 to increase or decrease demands on the performance of the output signal 24. For example, when the control circuit 62 determines based on the feedback information 60 that compliance of a performance metric with a corresponding threshold associated with a defined performance level is threatened, or that the performance metric is non-compliant, the control circuit 62 correspondingly adjusts baseband processing to decrease demands on the performance on the output signal 24. Decreasing demands in this regard means that a different threshold associated with a more relaxed performance level is selected for comparison to the performance metric. Compliance with this threshold thus proves more attainable due to the decreased performance demands.

Baseband processing adjustment in some embodiments, for example, includes adjusting one or more modulation and coding schemes (MCSs) applied to input signal 68. Lowering the order of MCS applied to the input signal 68 decreases demands on the performance of the output signal 24, at least in terms of the output signal's quality. Baseband processing adjustment in other embodiments alternatively or additionally includes adjusting multi-antenna processing of the input signal 68, adjusting impairment mitigation processing applied to the input signal 68 (e.g., HARQ), and/or adjusting the relative data power ratios associated with the input signal 68.

In other embodiments, the control circuit 62 adjusts baseband processing of the input signal 68 to assist the radio transmitter 28 in meeting defined demands on the performance of the output signal 24. Assistance in this regard means that the baseband processing adjustments better enable one or more performance metrics to be in compliance with one or more corresponding thresholds associated with a defined performance level. Compliance with the one or more thresholds thus proves more attainable. Baseband processing adjustments may include, for instance, adjusting time-based scheduling of traffic to be transmitted over the input signal 68. Scheduling traffic to be transmitted at a different time, for instance, better enables current compliance of a performance metric.

In yet other embodiments, the control circuit 62 is configured to adjust radio resource control processing of input signal 68, rather than baseband processing. That said, such radio resource control processing adjustments are still performed to assist the radio transmitter 28 in meeting defined demands on the performance of the output signal 24. Such adjustments, though, take the form of bearer load-balancing. The signal processing control circuit 66 of the radio network control 52 in FIG. 10 is configured to perform these radio resource control processing adjustments in some embodiments.

Those skilled in the art will appreciate that a UE 14 herein may comprise a mobile terminal, a laptop computer, or any type of wireless communication device. Also, no particular communication interface standard is necessary for practicing the present invention. The network 10, therefore, may be any one of a number of standardized network implementations, including Long Term Evolution (LTE), LTE-Advanced, or the like.

Moreover, the circuits discussed above may comprise a processor circuit (consisting of, for example, one or more microprocessors, microcontrollers, digital signal processors, or the like) configured with appropriate software and/or firmware to carry out one or more of the techniques discussed above. The circuits may alternatively be implemented (in whole or in part) by one or more dedicated integrated circuits, such as one or more field-programmable gate arrays (FPGAs) or application-specific integrated circuits (ASICs).

Figure 11:
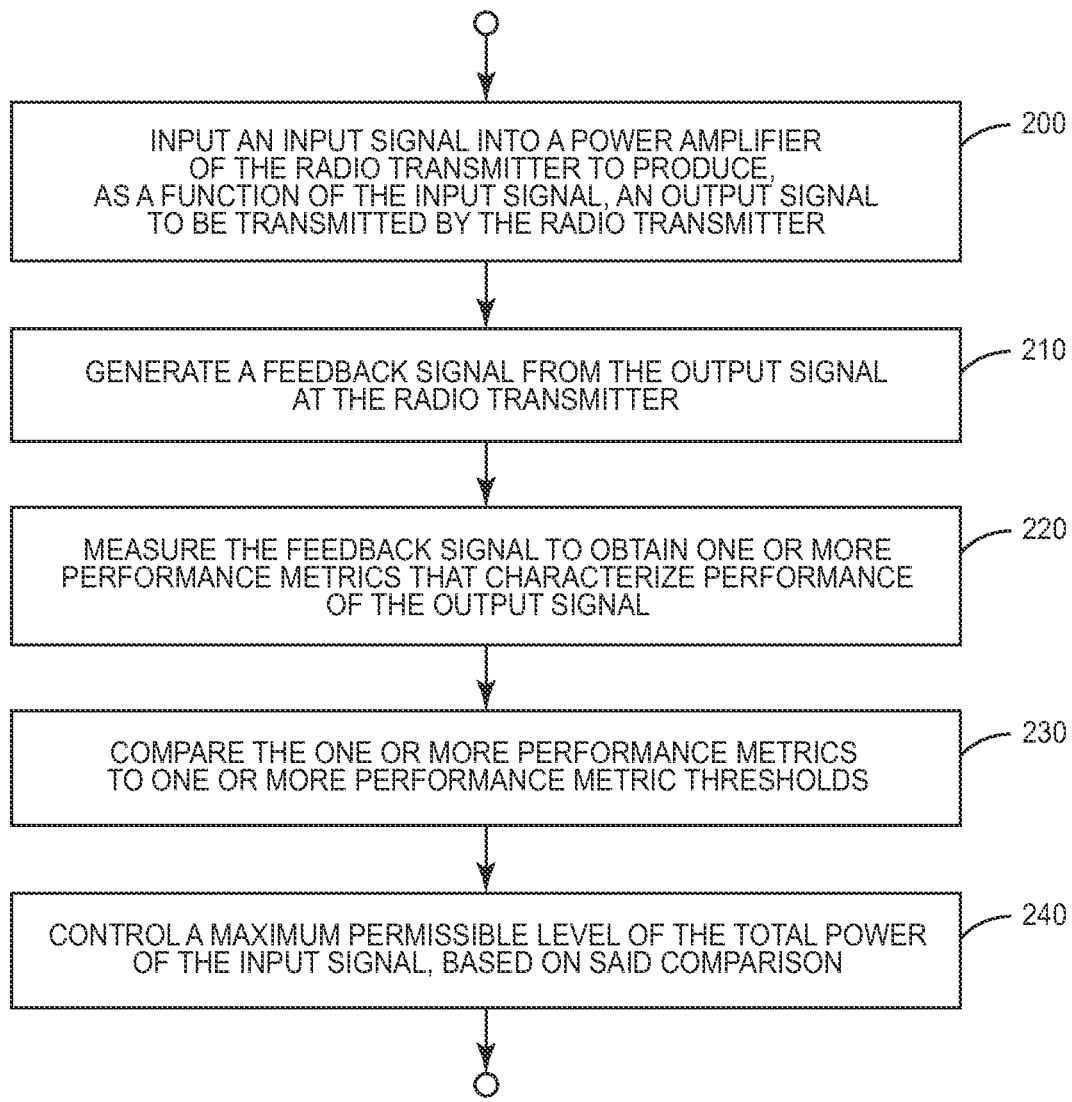
FIG. 11 is a logic flow diagram of processing performed by a radio transmitter according to one or more embodiments.

In view of the above modifications and variations, those skilled in the art will appreciate that a radio transmitter 28 of a radio access node 22 herein generally performs the processing shown in FIG. 11 for controlling the total power with which the transmitter 28 transmits a signal 24. This processing entails inputting an input signal 38 into a power amplifier 32 of the radio transmitter 28 to produce, as a function of the input signal 38, an output signal 24 to be transmitted by the radio transmitter 28 (Block 200). Processing also includes generating a feedback signal 40 from the output signal 24 at the transmitter 28 (Block 210), and measuring the feedback signal 40 to obtain one or more performance metrics that characterize performance of the output signal 24 (Block 220). Processing then further entails comparing the one or more performance metrics to one or more performance metric thresholds (Block 230), and controlling a maximum permissible level of the total power of the input signal 38 based on that comparison (Block 240).

Figure 12:
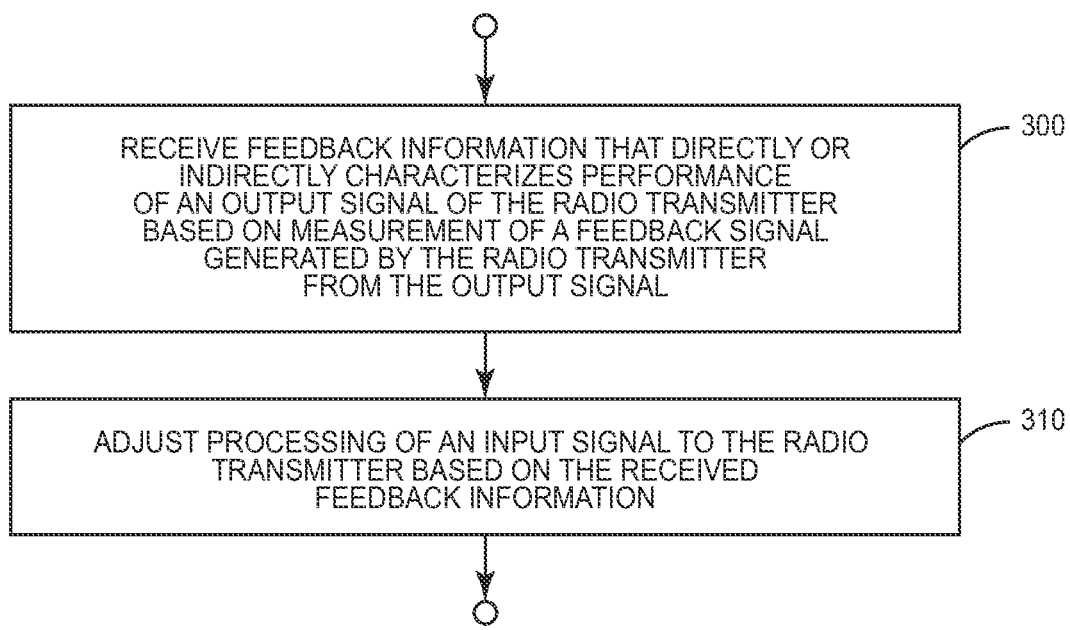
FIG. 12 is a logic flow diagram of processing performed by a signal processing control circuit according to one or more embodiments.

Those skilled in the art will also appreciate that a signal processing control circuit 62, 66 herein generally performs the processing shown in FIG. 12 for controlling processing of a signal 24 transmitted by the transmitter 28. As shown in FIG. 12, such processing includes receiving feedback information 60 that directly or indirectly characterizes performance of an output signal 24 of the radio transmitter 28 based on measurement of a feedback signal 60 generated by the radio transmitter 28 from the output signal 24 (Block 300). Processing also entails adjusting processing of an input signal 38 to the radio transmitter 28 based on the received feedback information 60 (Block 310).

Figure 13:
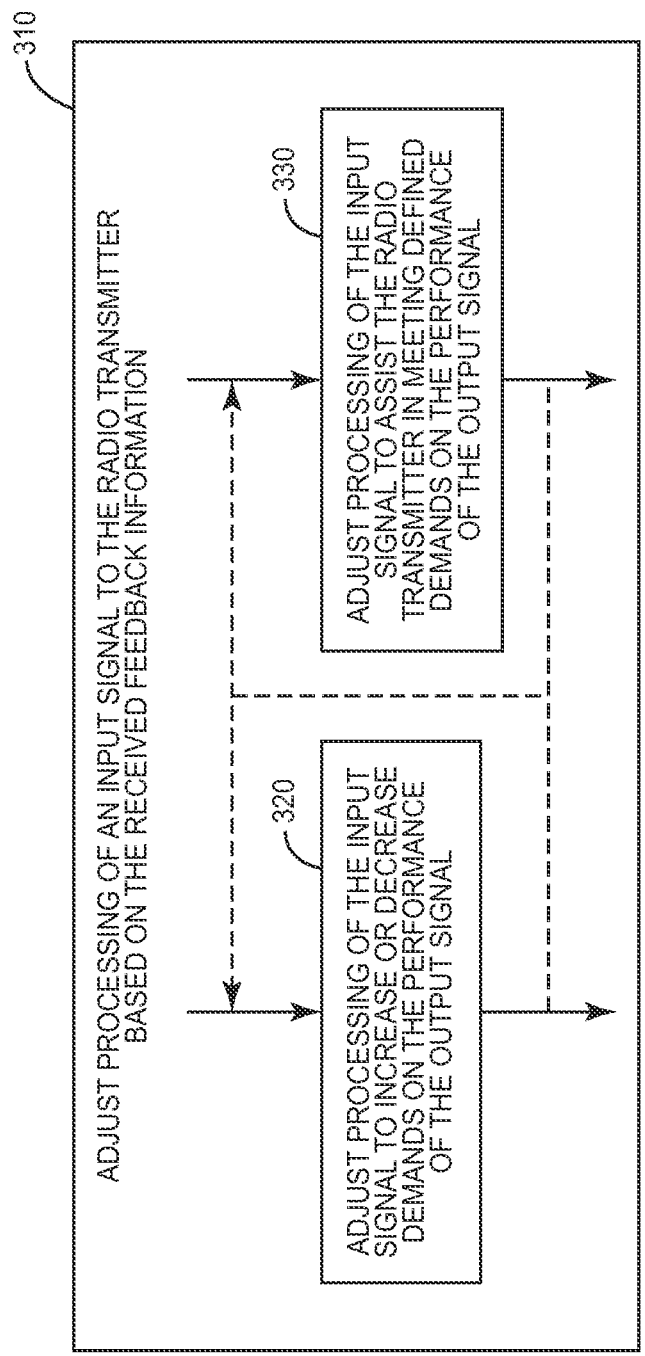
FIG. 13 is a logic flow diagram of processing performed for adjusting the processing of a signal input to a radio transmitter, according to one or more embodiments.

Such adjustment, as shown in FIG. 13, may be done to achieve one or more results. In particular, adjusting processing of the input signal 38 may be done to increase or decrease demands on the performance of the output signal 24 (Block 320). Alternatively or additionally, adjusting processing of the input signal 38 may be done to assist the radio transmitter 28 in meeting defined demands on the performance of the output signal 24 (Block 330).

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of controlling the total power with which a radio transmitter of a radio access node transmits a signal, the method comprising:

inputting an input signal into a power amplifier of the radio transmitter to produce, as a function of the input signal, an output signal to be transmitted by the radio transmitter;

generating a feedback signal from the output signal at the radio transmitter;

measuring the feedback signal to obtain one or more performance metrics that characterize performance of the output signal;

comparing the one or more performance metrics to one or more performance metric thresholds; and controlling a maximum permissible level of the total power of the input signal, based on said comparison, wherein said controlling comprises controlling said maximum permissible level to maintain at least one of said one or more performance metrics in long-term compliance with a corresponding performance metric threshold associated with a first defined performance level of the output signal, with tolerance for short-term non-compliance of the at least one performance metric with that threshold.

2. The method of claim 1, wherein said controlling comprises:

monitoring, based on said comparison, whether or not the at least one performance metric is in compliance with the corresponding performance metric threshold;

responsive to said monitoring indicating that the at least one performance metric is not in compliance, monitoring a duration for which the at least one performance metric continues in non-compliance; and responsive to said duration reaching or exceeding a defined non-compliance duration threshold, decreasing said maximum permissible level such that the at least one performance metric returns to being in compliance.

3. The method of claim 1, wherein said controlling comprises tolerating said short-term non-compliance provided that a temperature measured by a temperature sensor included in the radio transmitter remains in compliance with a temperature threshold associated with a second defined performance level of the output signal, wherein the second defined performance level reflects a lower performance level of the output signal than that reflected by the first defined performance level.

4. The method of claim 1, wherein the at least one performance metric characterizes the performance of the output signal in terms of signal quality.

5. The method of claim 1, wherein said controlling comprises controlling said maximum permissible level to also maintain at least one other of said one or more performance metrics in compliance with a corresponding performance metric threshold, without tolerance for short-term non-compliance with that threshold.

6. The method of claim 5, wherein the at least one other performance metric characterizes the performance of the output signal in terms of spectral emissions.

7. The method of claim 1, wherein the one or more performance metrics characterize the performance of the output signal in terms of at least one of signal quality and spectral emissions.

8. The method of claim 1, further comprising dynamically adapting an accuracy granularity or a periodicity of said measuring of the feedback signal, based on at least one of:

the total power with which the radio transmitter transmits the output signal;

a temperature measured by a temperature sensor included in the radio transmitter; and one or more of said performance metrics.

9. The method of claim 1, further comprising sending feedback information to a baseband processing circuit of the radio access node directly or indirectly indicating said one or more performance metrics.

10. The method of claim 1, wherein multiple different possible performance metric thresholds are defined for at least one performance metric, with different possible thresholds being associated with different possible performance levels of the output signal and different possible baseband processing parameter selections, wherein the method further comprise selecting a performance metric threshold for the at least one performance metric from the different possible thresholds defined for that metric, based on a current baseband processing parameter selection, and wherein said comparing comprises comparing the at least one performance metric to the threshold selected for that metric.

11. A radio transmitter of a radio access node, comprising:

a power amplifier configured to produce, as a function of an input signal into the power amplifier, an output signal to be transmitted by the radio transmitter;

a feedback generation circuit configured to generate a feedback signal from the output signal; and a power control circuit configured to:

measure the feedback signal to obtain one or more performance metrics that characterize performance of the output signal;

compare the one or more performance metrics to one or more performance metric thresholds; and control a maximum permissible level of the total power of the input signal, based on said comparison, to maintain at least one of said one or more performance metrics in long-term compliance with a corresponding performance metric threshold associated with a first defined performance level of the output signal, with tolerance for short-term non-compliance of the at least one performance metric with that threshold.

12. The radio transmitter of claim 11, wherein the power control circuit is configured to:

monitor, based on said comparison, whether or not the at least one performance metric is in compliance with the corresponding performance metric threshold;

responsive to said monitoring indicating that the at least one performance metric is not in compliance, monitor a duration for which the at least one performance metric continues in non-compliance; and responsive to said duration reaching or exceeding a defined non-compliance duration threshold, decrease said maximum permissible level such that the at least one performance metric returns to being in compliance.

13. The radio transmitter of claim 11, wherein the power control circuit is configured to tolerate said short-term non-compliance provided that a temperature measured by a temperature sensor included in the radio transmitter remains in compliance with a temperature threshold associated with a second defined performance level of the output signal, wherein the second defined performance level reflects a lower performance level of the output signal than that reflected by the first defined performance level.

14. The radio transmitter of claim 11, wherein the at least one performance metric characterizes the performance of the output signal in terms of signal quality.

15. The radio transmitter of claim 11, wherein the power control circuit is configured to control said maximum permissible level to also maintain at least one other of said one or more performance metrics in compliance with a corresponding performance metric threshold, without tolerance for short-term non-compliance with that threshold.

16. The radio transmitter of claim 15, wherein the at least one other performance metric characterizes the performance of the output signal in terms of spectral emissions.

17. The radio transmitter of claim 11, wherein the power control circuit comprises at least one of:
- a spectrum analyzer configured to obtain one or more performance metrics that characterize the performance of the output signal in terms of spectral emissions; and
- a signal quality monitor configured to obtain one or more performance metrics that characterize the performance of the output signal in terms of signal quality.

18. The radio transmitter of claim 11, wherein the power control circuit is further configured to dynamically adapt an accuracy granularity or a periodicity of said measuring of the feedback signal, based on at least one of:
- the total power with which the radio transmitter transmits the output signal;
- a temperature measured by a temperature sensor included in the radio transmitter; and
- one or more of said performance metrics.

19. The radio transmitter of claim 11, wherein the power control circuit is further configured to send feedback information to a baseband processing circuit of the radio access node directly or indirectly indicating said one or more performance metrics.

20. The radio transmitter of claim 11, wherein multiple different possible performance metric thresholds are defined for at least one performance metric, with different possible thresholds being associated with different possible performance levels of the output signal and different possible baseband processing parameter selections, and wherein the power control circuit is configured to:
- select a performance metric threshold for the at least one performance metric from the different possible thresholds defined for that metric, based on a current baseband processing parameter selection; and
- compare the at least one performance metric to the threshold selected for that metric.

* * * * *

UNITED STATES PATENT AND TRADEMARK OFFICE
CERTIFICATE OF CORRECTION

PATENT NO. : 9,031,601 B2  
APPLICATION NO. : 13/602909  
DATED : May 12, 2015  
INVENTOR(S) : Coe et al.

Page 1 of 1

It is certified that error appears in the above-identified patent and that said Letters Patent is hereby corrected as shown below:

On the Title Page, in Item (75), under "Inventors", in Column 1, Line 1, delete "Ottowa" and insert -- Ottawa --, therefor.

IN THE SPECIFICATION

In Column 5, Line 46, delete "transmitter 38" and insert -- transmitter 28 --, therefor.

In Column 7, Line 3, delete "transmitter 38" and insert -- transmitter 28 --, therefor.

In Column 8, Line 10, delete "conversatively" and insert -- conservatively --, therefor.

In Column 10, Line 11, delete "seconds)." and insert -- seconds. --, therefor.

In Column 11, Line 4, delete "transmitter 38" and insert -- transmitter 28 --, therefor.

In Column 12, Line 30, delete "circuit(s) 26." and insert -- circuit(s) 26). --, therefor.

In Column 12, Line 39, delete "qualities)." and insert -- qualities. --, therefor.

Signed and Sealed this  
Sixteenth Day of February, 2016

Michelle K. Lee  
*Director of the United States Patent and Trademark Office*